(12) United States Patent
Tsuboi (10) Patent No.: US 8,832,678 B2
(45) Date of Patent: Sep. 9, 2014

(54) APPARATUS AND PRINTER

(75) Inventor: Masanori Tsuboi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 41 days.

(21) Appl. No.: 13/356,289

(22) Filed: Jan. 23, 2012

(65) Prior Publication Data

US 2012/0192174 A1 Jul. 26, 2012

(30) Foreign Application Priority Data

Jan. 25, 2011 (JP) ................................. 2011-013254

(51) Int. Cl.
*G06F 9/445* (2006.01)

(52) U.S. Cl.
USPC .......................................... 717/171; 717/176

(58) Field of Classification Search
CPC combination set(s) only.
See application file for complete search history.

(56) References Cited

U.S. PATENT DOCUMENTS

| 7,089,553 | B1 | 8/2006 | Glaser et al. |
| 7,765,540 | B2 * | 7/2010 | McCollum et al. ........... 717/174 |
| 2003/0140174 | A1 | 7/2003 | Ohishi |
| 2005/0289536 | A1 | 12/2005 | Nayak et al. |

FOREIGN PATENT DOCUMENTS

| JP | 2000-305756 A | 11/2000 |
| JP | 2001-344082 A | 12/2001 |
| JP | 2009-098789 A | 5/2009 |

* cited by examiner

*Primary Examiner* — Chuck Kendall
(74) *Attorney, Agent, or Firm* — Canon USA Inc. IP Division (57) ABSTRACT

An apparatus includes a framework for installing an application based on manifest information, and uses a prescription manifest prescribed to be used when using the framework. The apparatus determines whether the apparatus is a model for changing a declaration value of a manifest file. When the apparatus determines that the apparatus is the model for changing the declaration value of the manifest file, a manifest file added for the model for changing the declaration value of the manifest file is overwritten to the manifest file as a default.

7 Claims, 9 Drawing Sheets

APPARATUS AND PRINTER

BACKGROUND OF THE INVENTION

1. Field of the Invention

The present invention relates to an apparatus having a framework and a printer.

2. Description of the Related Art

The Open Services Gateway initiative (OSGi) Alliance advocates an OSGi framework as a framework for managing a life cycle of an application, such as execution start/stop of the application. In the OSGi framework, an application format is prescribed as ajar file in a Java compression format. The jar file is created by collecting a plurality of class files into one file as an archive. Further, the jar file includes a MANIFEST.MF file having a description of the jar file. With a description of an attribute of an OSGi specification to the manifest file, the OSGi framework manages the life cycle of the application according to the described attribute.

In an image forming apparatus, it is attempted to install the application externally and load the application. Further another image forming apparatus loaded with a system in conformity with the above described OSGi framework is widespread. Moreover, another image forming apparatus appears in which not only the attribute of the OSGi specification but also a unique attribute is defined and extended to the manifest file.

The presence or absence of an available function and a hard disk drive (HDD) capacity or a memory capacity varying depending on an apparatus model. It is in demand to construct a system to be capable of installing a created application to the plurality of different models. Japanese Patent Application Laid-Open No. 2000-305756 discusses a method for changing install contents of one application depending on the remaining amount of a hard disk drive (HDD) at the install destination. As discussed in Japanese Patent Application Laid-Open No. 2000-305756, if a free capacity of the HDD is small, the install is controlled to compress and temporarily install the application and, when the free capacity is assured, to decompress the application.

SUMMARY OF THE INVENTION

According to an aspect of the present invention, an apparatus has a framework for installing an application based on manifest information and using a prescription manifest determined to be used when using the framework. The apparatus includes a determination unit configured to determine, when installing the application to the apparatus, whether another manifest information is required in addition to the prescription manifest based on model information of the apparatus, and a transmission unit configured, when the determination unit determines that the other manifest information is not required, to transmit information on the prescription manifest to the framework without transmitting the other manifest information, and configured, when the determination unit determines that the other manifest information is required, to transmit the other manifest information in addition to the information on the prescription manifest to the framework. The framework installs, when the transmission unit transmits the information on the prescription manifest and the information on the other manifest, the application based on both the information.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

A conventional art does not consider to install an application by changing a declaration value or an application name according to attributes varying depending on each apparatus, such as the presence or absence of an available function, a hard disk drive (HDD) capacity, or a memory capacity.

For example, there is a difference in loaded units between a single function printer (SFP) and a multi function printer (MFP). With respect to an amount of resources of an image forming apparatus, the MFP can be larger than the SFP.

The present invention is directed to installing an application to apparatuses having different available functions, HDD capacities, or memory capacities, without departing from an OSGi standard specification, based on declaration values suitable to the individual apparatuses.

The present invention is described below according to an exemplary embodiment. An OSGi framework has a specification to read a manifest file named MANIFEST.MF included in a jar file. If there is a difference in presence or absence of an available function, an HDD capacity, or a memory capacity depending on printer models, there is a case where it is required to set an attribute value of the OSGi specification of the manifest file to each printer model. In this case, in the OSGi specification, even if an application having a plurality of the manifest files is formed, the OSGi framework cannot individually read the manifest files.

Therefore, the application having a modified description of the manifest file needs to be created for each printer model. A single application also has to be divided into two packages. Thus, it is disadvantageous that the application management becomes complicated. Further, an application provider needs to provide a different application obtained by modifying the single application depending on the model of the image forming apparatus owned by a user.

The present invention is directed to installing an application by modifying a declaration value of a manifest or an application name according to attributes varying depending on the presence or absence of an available function, an HDD capacity, or a memory capacity.

Hereinafter, a specific description is given according to an exemplary embodiment of the present invention with reference to the drawings. Components described according to the exemplary embodiment are examples, and the scope of the present invention is not limited to those.

Figure 1:
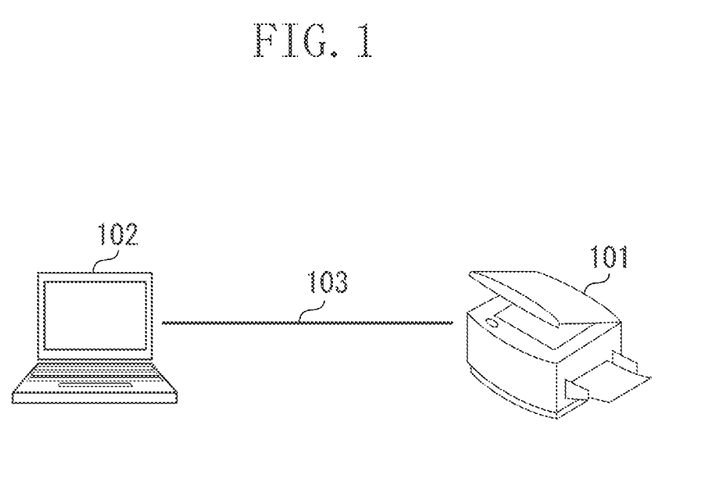
FIG. 1 illustrates a system configuration according to an exemplary embodiment of the present invention.

FIG. 1 illustrates a configuration of a network system including an information processing apparatus according to the exemplary embodiment of the present invention. Referring to FIG. 1, an image forming apparatus 101 combines functions such as a printer, a copy machine, and a facsimile (FAX) machine in a single apparatus. A plurality of applications can be installed on the image forming apparatus 101. The image forming apparatus 101 has a specific apparatus identifier (ID) assigned thereto. An information processing apparatus 102 is used to remotely operate the image forming apparatus 101. A network 103 is the Internet, etc. The image forming apparatus 101 communicates with the information processing apparatus 102 via the network 103.

Figure 2:
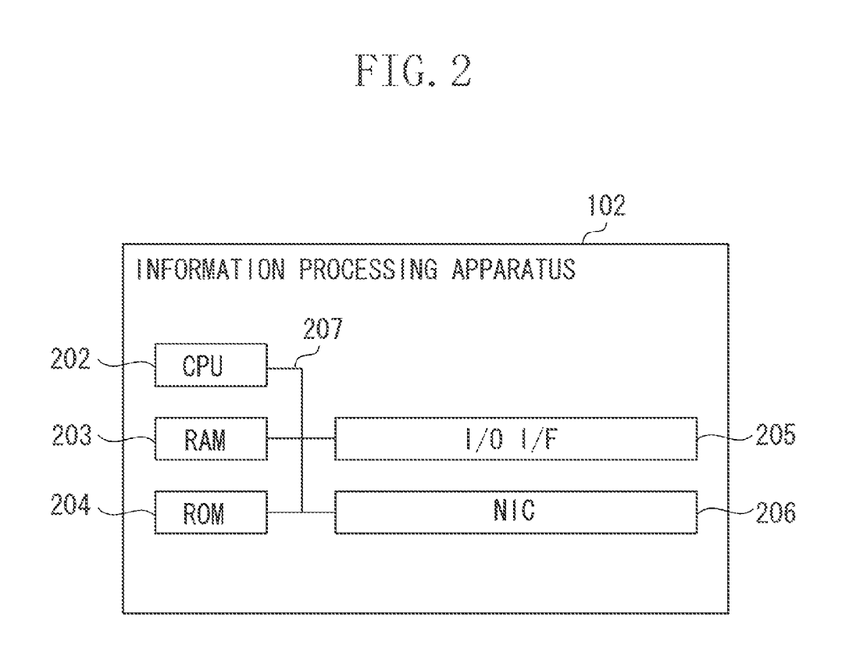
FIG. 2 illustrates a hardware configuration of an image forming apparatus according to the exemplary embodiment.

FIG. 2 illustrates a hardware configuration of the information processing apparatus 102. A central processing unit (CPU) 202 executes various programs, and realizes various functions. A read only memory (ROM) 204 stores various programs. The CPU 202 loads the program stored in the ROM 204 to a random access memory (RAM) 203 and executes the program.

The RAM 204 is also used as a unit for temporal operation work storage area of the CPU 202. An input/output interface 205 transmits data to each apparatuses and a display (not illustrated) connected to each servers. In addition, the input/output interface 205 receives data from a pointing device (not illustrated). A network interface card (NIC) 206 allows the information processing apparatus 102 to communicate with the image forming apparatus 101 via the network 103. The units can transmit and receive data via a bus 207.

The image forming apparatus 101 has the configuration in FIG. 2, and further has a print unit (not illustrated) and/or a scanner unit (not illustrated). If the image forming apparatus 101 is the MFP, the image forming apparatus 101 further includes another unit in addition to the print unit and/or the scanner unit. On the other hand, if the image forming apparatus 101 is the SFP, the image forming apparatus 101 does not include the scanner unit and is configured only the print unit. The print unit can transmit and receive data to/from each of the units via the bus 207. Further, the print unit can print various image data including raster image data to a recording medium or can transmit the image data to an external device. The scanner unit reads a document placed on a document positioning plate and generates image data.

Figure 3A:
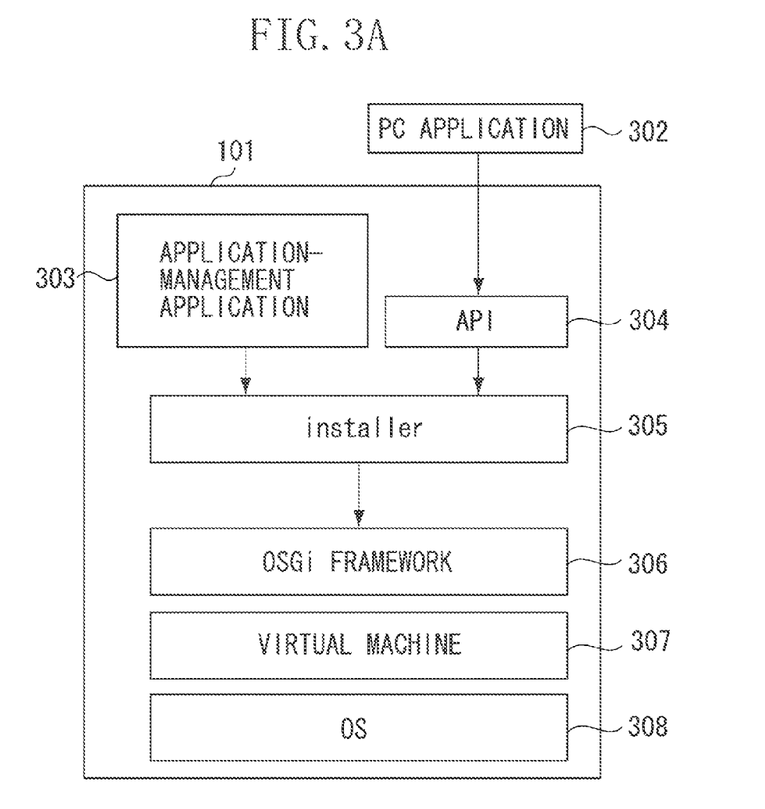
FIG. 3A illustrates a software configuration of the image forming apparatus according to the exemplary embodiment.

FIG. 3A illustrates a software configuration of the image forming apparatus 101. Programs for realizing each of the configuration units illustrated here are stored in the ROM 204. The programs are loaded to the RAM 203. The CPU 202 executes the programs, thereby realizing each of the configuration units. A personal computer (PC) application 302 installs an application. The information processing apparatus 102 includes the PC application 302. The PC application 302 requests install processing to an installer 305 via the NIC 206 by using an application programming interface (API) 304. An application-management application 303 displays a screen for instructing the application to a user, and issues an install instruction of the application to the installer 305. The information processing apparatus 102 can access the application-management application 303 via the NIC 206. The application-management application 303 requests the install processing to an OSGi framework 306 via the installer 305. The details of the installer 305 are described later.

The OSGi framework 306 installs the designated application in response to the install request from the installer 305, and further starts or stops the application. The OSGi framework 306 according to the present exemplary embodiment conforms to the specification of a standard framework prescribed under the OSGi Alliance. According to the present exemplary embodiment, the object is accomplished by realizing the configuration of the OSGi framework 306 without departing from the standard specification prescribed by the OSGi Alliance.

A virtual machine 307 is an execution environment for executing the application and is realized, for example, by a Java (registered trademark) virtual machine. The virtual machine 307 is an execution environment realized on an operation system (OS) 308 as a first execution environment. Further, the virtual machine 307 is a second execution environment for executing the application described based on the Java. The environments are provided for the image forming apparatus 101. As a consequence, even after producing the image forming apparatus 101, an application for controlling the print unit and/or the scanner unit in the image forming apparatus 101 can be installed and executed. The OS 308 is an execution environment controlling the entire image forming apparatus 101. The OS 308 includes each of modules of real-time OS that can control various functions of the copy machine in real time, or library groups that can critically control option devices of the copy machine and each function including an expansion card. Further, the OS 308 is realized by module groups that provide an interface command to the application operated at high order thereof.

Figure 3B:
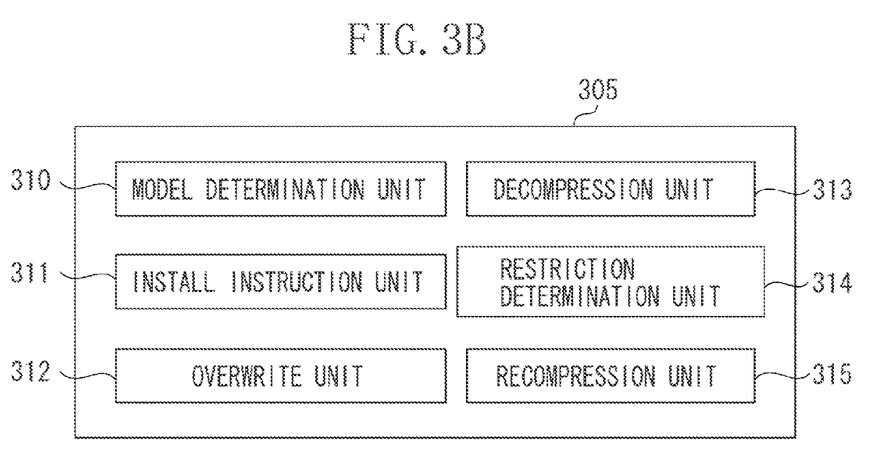
FIG. 3B illustrates a configuration of an installer.

A description is given of the installer 305 with reference to FIG. 3B. FIG. 3B illustrates a configuration of the installer 305. A model determination unit 310 determines whether the image forming apparatus 101 is a MFP or an SFP. Model information is provided for the image forming apparatus 101. Different model information is provided depending on as to whether the image forming apparatus 101 is the MFP or the SFP. The model determination unit 310 performs the determination processing based on the model information. An install instruction unit 311 issues an install request of the application to the OSGi framework 306.

An overwriting unit 312 performs processing for overwriting, to a part of a prescription manifest described later, a declaration value of another manifest. A decompression unit 313 decompresses the application that is instructed to be installed by the application-management application 303 or the PC application 302. A restriction determination unit 314 determines a restriction item when overwriting the manifest file. A recompression unit 315 recompresses file formats of an execution file and a file including a prescription manifest to which a declaration value of another manifest is overwritten by the overwriting unit 312.

Figure 4:
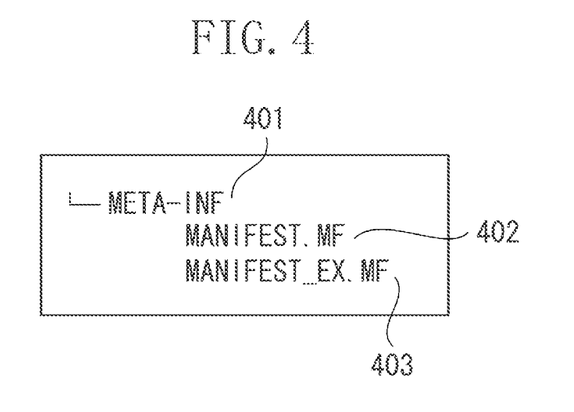
FIG. 4 illustrates a configuration of a manifest file according to the exemplary embodiment.

Creation of the application is described. FIG. 4 illustrates a directory configuration of the manifest file of the application according to the present exemplary embodiment. The application is obtained by compressing the file formats including the manifest file and the execution file. The manifest is synonymous with the manifest file.

When creating a jar file by a jar command, a MANIFEST.MF file 402 is automatically generated to a META-INF folder 401. According to the present exemplary embodiment, a manifest item is described for a model for changing the declaration value of the manifest file in addition to the automatically generated MANIFEST.MF file 402. Therefore, a MANIFEST_EX.MF file 403 is provided. In the META-INF folder 401 the application in the jar file format including above file is formed.

The automatically generated MANIFEST.MF file 402 is referred to as a prescription manifest, and the MANIFEST_EX.MF file 403 provided independently of the prescription manifest is referred to as another manifest. In conformity with the OSGi standard, the OSGi framework 306 reads only the declaration value described in the MANIFEST.MF file 402 as the prescription manifest. Therefore, the image forming apparatus 101 according to the present exemplary embodiment includes the decompression unit 313, the overwriting unit 312, and the recompression unit 315. The application is decompressed once, and the declaration value of the prescription manifest is rewritten and compressed. Thus, the best manifest to each model of the image forming apparatus 101 is used without departing from the OSGi standard.

A description is given of the install processing of the application. The user designates the application from the PC application 302 or the user interface (UI) screen provided by the application-management application 303, and installs the application. The installer 305 requests the install processing of the input application to the OSGi framework 306.

Figure 5:
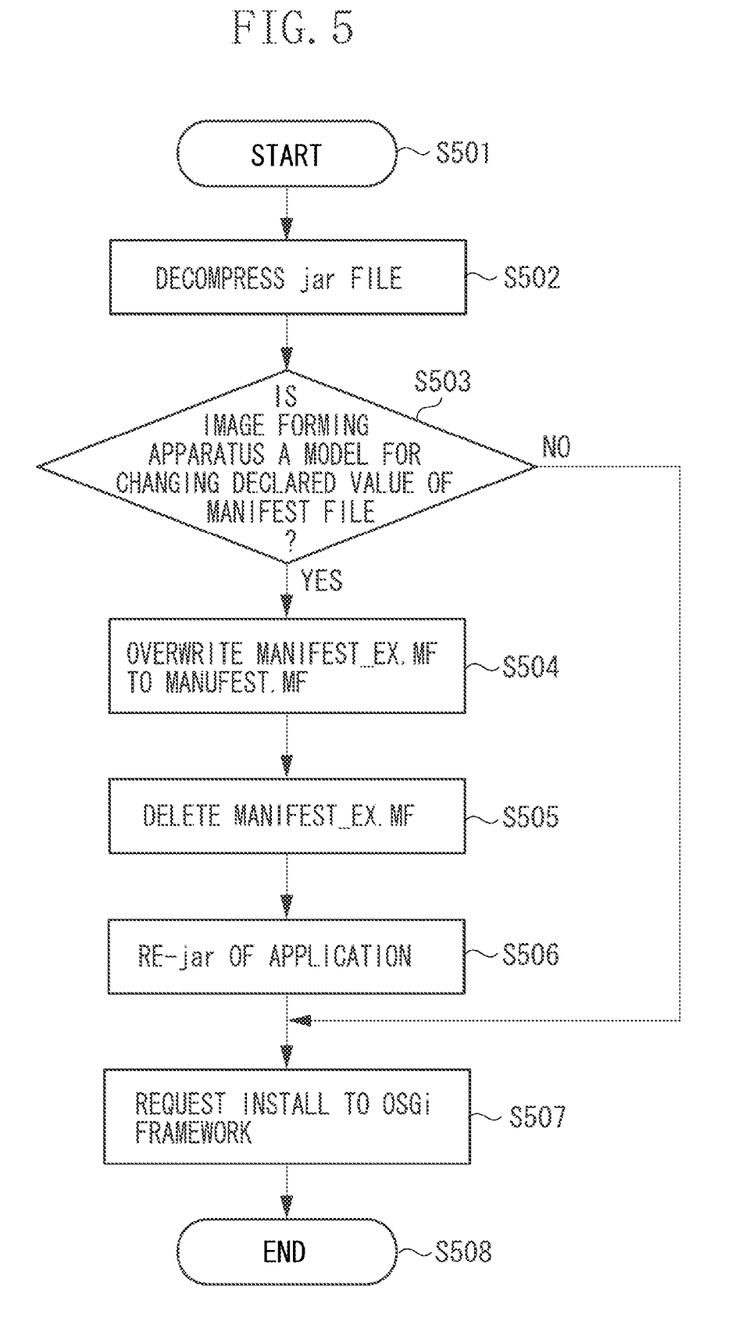
FIG. 5 illustrates a flowchart executed by the installer according to the exemplary embodiment.

FIG. 5 illustrates a flowchart of processing of the installer 305, i.e., processing from reception of an instruction for the install processing to a request of the install processing to the OSGi framework 306. In step S501, the processing starts. In step S502, the decompression unit 313 decompresses the application in the jar file format.

In step S503, the model determination unit 310 determines whether the image forming apparatus 101 is a model for changing the declaration value of the manifest file, based on the model information. When the model information does not indicate the model for changing the declaration value of the manifest file (NO in step S503), in step S507, the install instruction unit 311 requests the install processing to the OSGi framework 306. Then, in step S508, the processing ends. In this case, the image forming apparatus 101 is the MFP, and the MANIFEST.MF file 402 is also a manifest prepared for the MFP. Therefore, the overwriting processing is not executed.

When the model information indicates the model for changing the declaration value of the manifest file (YES in step S503), in step S504, the overwriting unit 312 overwrites the declaration value of the MANIFEST_EX.MF file 403 in the application to a part of the MANIFEST.MF file 402. An overwriting logic is described with reference to FIG. 6. In step S505, the overwriting unit 312 deletes the MANIFEST_EX.MF file 403 that is unnecessary.

In step S506, the recompression unit 315 recompresses the formats of the execution file and the file constituted by the prescription manifest in the jar file format, and stores the application. In step S507, the install instruction unit 311 requests the install operation of the application recompressed by the recompression unit 315 to the OSGi framework 306. In step S508, the processing ends.

With the processing, the OSGi framework 306 installs the application, based on the model information, by any one of the processing for installing the application only by the prescription manifest and the processing for installing the application based on both the prescription manifest and another. The application is installed by using the manifest relating to the application for install.

The installer 305 has the configuration in FIG. 3B, and executes the processing in FIG. 5. Thus, a common application is formed to a plurality of different image forming apparatuses. Then, the application is installed conforming with the OSGi specification without correcting the OSGi framework 306.

Figure 6:
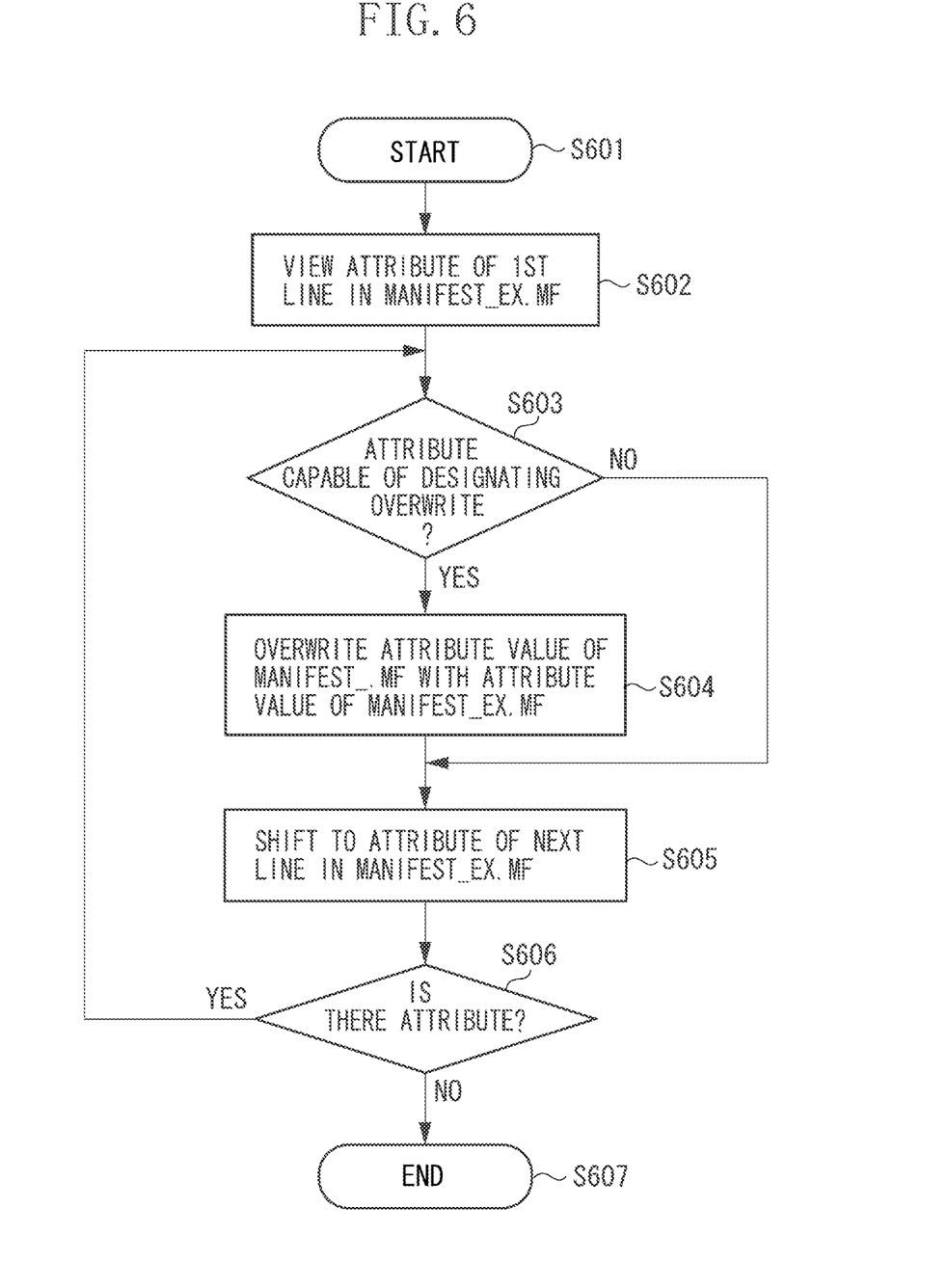
FIG. 6 illustrates a flowchart executed by an overwriting unit according to the exemplary embodiment.

FIG. 6 illustrates a flowchart of an overwriting procedure in step S504. In step S601, the processing starts. In step S602, the overwriting unit 312 refers to the attribute of the first line described in the MANIFEST_EX.MF file 403, in other words, the declaration value. In step S603, the overwriting unit 312 determines whether the attribute that is currently referred to is an attribute which is capable of designating overwrite and is described later. When the attribute is capable of designating overwrite (YES in step S603), in step S604, the attribute value of the MANIFEST.MF file 402 matching the attribute that is referred to is capable of designating overwrite with the attribute value of the MANIFEST_EX.MF file 403. In step S605, the processing shifts to a check operation of the attribute on the next line in the MANIFET_EX.MF file 403. When the attribute is not capable of designating overwrite (NO in step S603), in step S605, the processing shifts to the attribute on the next line in the MANIFET_EX.MF file. In step S606, it is determined whether there is an attribute. When there is not an attribute (NO in step S606), in step S607, the processing ends. When there is an attribute (YES instep S606), the processing returns to step S603.

Figure 7:
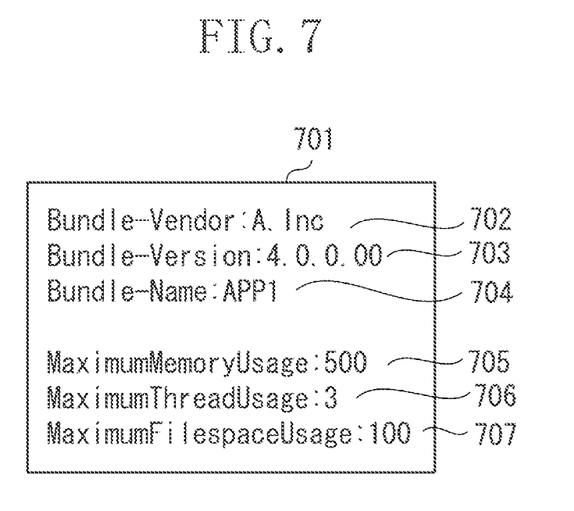
FIG. 7 illustrates a MANIFEST.MF file according to the exemplary embodiment.

FIG. 7 illustrates a declaration value 701 of the MANIFEST.MF file 402, a vender name 702 of a bundle, a version 703 of the bundle, a bundle name 704, a maximum memory usage 705 of the application, a maximum thread usage 706, and a maximum disk space 707. The MANIFEST.MF file 402 is for the MFP.

Figure 8:
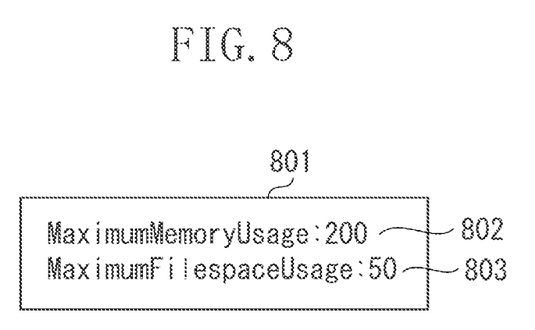
FIG. 8 illustrates a MANIFEST_EX.MF file according to the exemplary embodiment.

801 of FIG. 8 illustrates a MANIFEST_EX.MF file illustrated by the MANIFEST_EX.MF file 403. 802 describes "MaximumMemoryUsage" and 803 describes "MaximumFilespaceUsage". The descriptions are for the casein which the two items are to be changed in a model for changing the declaration value of the manifest file. The "MaximumMemoryUsage" 802 and the "MaximumFilespaceUsage" 803 indicate declaration values of a memory capacity and an HDD capacity used when executing the application. The application is executed by referring to the declaration values. The MANIFEST_EX.MF file is used when overwriting the declaration value of a part of the manifest file for the MFP. A value of the using amount of resources of the manifest file for the MFP is set to be larger than that of the manifest file for the SFP. This is because the MFP has the amount of resources larger than that of the SFP. Since a large amount of resources used when executing the application is ensured to the MFP, the application can be processed faster than that with the SFP.

Figure 9:
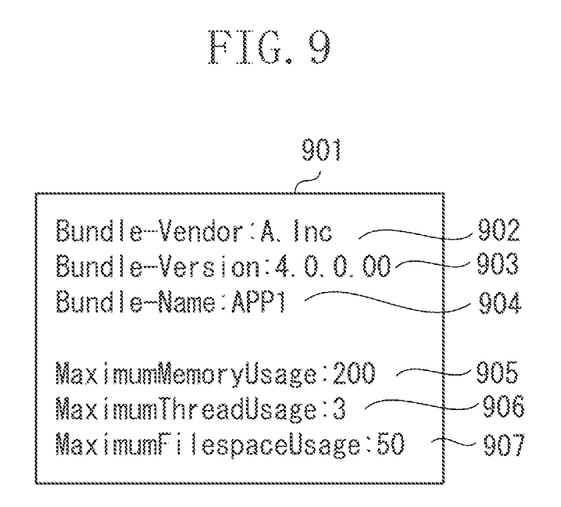
FIG. 9 illustrates the MANIFEST.MF file after recompression according to the exemplary embodiment.

Referring to 901 of FIG. 9, a MANIFEST.MF file as a prescription manifest is created in step S504 when the install destination of the application is a model for changing the declaration value of the manifest file. The same attribute 705 as an attribute 802 is overwritten. Further, the same attribute 707 as an attribute 803 is overwritten. Items 902, 903, 904, and 906 have the same value as the value 701. Obviously, items 905 and 907 have the value of the MANIFEST_EX.MF of 801.

A complementary description is added to FIG. 5. Although not illustrated according to the present exemplary embodiment, the following processing may be performed between steps S502 and S503. In other words, processing is performed when reading the conventional application. The conventional application includes only the prescription manifest. In this case, the overwriting processing cannot be executed. After step S502, it is determined whether the decompressed application includes a manifest different from the prescription manifest. When the decompressed application does not include the manifest different from the prescription manifest, the processing advances to step S507 whereupon the OSGi framework 306 installs the application. With the processing, it is possible to provide the image forming apparatus 101 corresponding to the conventional application, already released in the market, in addition to the new application according to the present exemplary embodiment.

The description is given of the installer 305 to switch whether to install the application only by using the first manifest that is prescribed by the OSGi framework 306 or to install the application by using together the second manifest that is not prescribed based on the model information of the image forming apparatus 101. The installer 305 forms the specification of the OSGi framework 306 without departing from the OSGi standard. Further, the application is not necessarily required for each model of the image forming apparatus 101. As a consequence, a provider of the application may provide only a predetermined application independently of the model of the image forming apparatus 101 owned by the user.

The restriction item is described. The restriction item used for the determination in step S603 is finally described. The PC application 302 and the application-management application 303 refer to a part of the attribute of the MANIFEST.MF file when issuing an instruction to install the application, thereby displaying the attribute value on the screen of the information processing apparatus 102. The display attribute and attribute value are different between the PC application 302 and the application-management application 303. If the attribute value of the display attribute is described to the MANIFEST_EX.MF file and the change thereof is permitted, the application side has to correct the MANIFEST_EX.MF file by referring to the MANIFEST_EX.MF file to display the manifest file. To prevent the influence, the attribute capable of being described to the MANIFEST_EX.MF file 801 is restricted. When describing the attribute other than the attribute, which is capable of being described, the attribute is to be ignored without being overwritten.

An overwritable manifest attribute includes Maximum-MemoryUsage and MaximumFileSpaceUsage. Further, a non-overwritable manifest attribute includes Bundle-Vender and Bundle-Name.

A description is given according to a modification of the exemplary embodiment. According to the exemplary embodiment, it is discussed of the method for overwriting contents of a MANIFEST_EX.MF file to a MANIFEST.MF file. Alternatively, the present invention can be accomplished by deleting the MANIFEST.MF file and rewriting a file name of the MANIFEST_EX.MF to the MANIFEST.MF. In this case, all information required for the install processing needs to be described to the MANIFEST_EX.MF file from the start time as illustrated in FIG. 9. According to the exemplary embodiment, when a developer forms the MANIFEST_EX.MF file, only a change may be described. Therefore, the amount of development hours of the developer is smaller than that according to the modification.

According to the exemplary embodiment, the distinction is performed based on the type of the image forming apparatus 101 such as the MFP or the SFP, and the model information is set. In other words, a flag indicating the MFP or a flag indicating the SPF is stored to the image forming apparatus 101. However, the present invention is not limited to this. For example, the distinction may be performed based on information such as a memory capacity, a capacity of a central processing unit (CPU), or provided option. Based on the distinction result, the model information may be set. In this case, a flag "0" may be assigned to an image forming apparatus having the memory capacity of a certain threshold or more, and a flag "1" may be assigned to an image forming apparatus having the memory capacity of less-than the certain threshold.

Furthermore, the use of manifest may be distinguished based on a device type, e.g., device identification (ID) or a specific ID of the image forming apparatus, and the model information may be set based on the distinction result. Moreover, in response to expansion of resources or option, the model information may be switched halfway. Thus, it is possible to properly install the application according to the situation of the currently used image forming apparatus.

According to the exemplary embodiment, the model determination unit 310 is provided. Alternatively, without providing the model determination unit 310, previously setting whether another manifest is required to the image forming apparatus 101, a determination unit may be provided to determine whether another manifest is required.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-013254 filed Jan. 25, 2011, which is hereby incorporated by reference herein in its entirety.

What is claimed is:

1. A printer having a framework for installing an application based on manifest information and using a prescription manifest determined to be used when using the framework, the printer comprising:
  a confirmation unit configured to confirm model information of the printer;
  a determination unit configured to determine, when installing the application to the printer, whether another manifest information is required in addition to the prescription manifest based on the model information of the printer confirmed by the confirmation unit; and
  a transmission unit configured, when the determination unit determines that the other manifest information is not required, to transmit information on the prescription manifest to the framework without transmitting the other manifest information, and configured, when the determination unit determines that the other manifest information is required, to edit the information on the prescription manifest using the other manifest information and to transmit the edited information on the prescription manifest to the frame work, wherein the framework installs, when the transmission unit transmits the edited information on the prescription manifest, the application based on the edited information on the prescription manifest.

2. The printer according to claim 1, further comprising:
an overwriting unit configured to overwrite the other manifest information to a part of the prescription manifest,
wherein the transmission unit is configured to transmit the prescription manifest on which the overwriting unit overwrites the other manifest to the part of the prescription manifest, thereby transmitting the information on the prescription manifest and the information on the other manifest.

3. The printer according to claim 2, wherein the prescription manifest and the other manifest is configured to describe a declaration value that declares a memory capacity assigned to the application, and
wherein the overwriting unit is configured to overwrite the declaration value that declares the memory capacity assigned to the application.

4. The printer according to claim 3, wherein the application is configured to have a format obtained by compressing formats including an execution file and a manifest file, the apparatus further comprises:
a decompression unit configured to decompress the application; and
a compression unit configured to recompress the format including the execution file and the prescription manifest to which the overwriting unit overwrites the other manifest information to the part of the prescription manifest after the decompression of the decompression unit.

5. The printer according to claim 1, wherein the application is configured to control a print unit or a scanner unit.

6. A printer including a framework configured to manage a life cycle of an application and further configured to manage the application as a management target based on a declaration value of a manifest having a prescription name relating to the application, the printer comprising:

a confirmation unit configured to confirm printer information for recognizing whether the printer is a multi-function printer or a single function printer;
a determination unit configured, when installing a predetermined application and the framework manages the application as a management target, to determine whether another manifest needs to be used in addition to the manifest having the prescription name based on the printer information of the printer confirmed by the confirmation unit; and
a transmission unit configured, when the determination unit determines that the other manifest does not need to be used, to transmit the declaration value of the manifest having the prescription name to the framework without using a declaration value of the other manifest, and configured, when the determination unit determines that the other manifest needs to be used, to use the declaration value of the other manifest for the declaration value of the manifest having the prescription name and then transmit the declaration value of the manifest having the prescription name to the framework.

7. A printer configured to be a single function printer including only a print unit as an image processing unit and executes an application, the printer comprising:
a framework configured to manage a life cycle of the application, and further configured to manage the application as a management target based on a declaration value of a manifest having a prescribed file name relating to the application; and
a confirmation unit configured to confirm a flag assigned to the single function printer,
wherein the printer is configured, when the flag confirmed by the confirmation unit indicating that the manifest having the prescribed file name is rewritten is assigned to the printer, to rewrite the declaration value of the manifest without changing the prescribed file name, to transmit the manifest having the prescribed file name after the rewriting to the framework, and to request the install.

* * * * *